J. D. BELTON.
APPARATUS FOR PREPARING FOOD.
APPLICATION FILED JULY 13, 1916.
1,228,640.
Patented June 5, 1917.
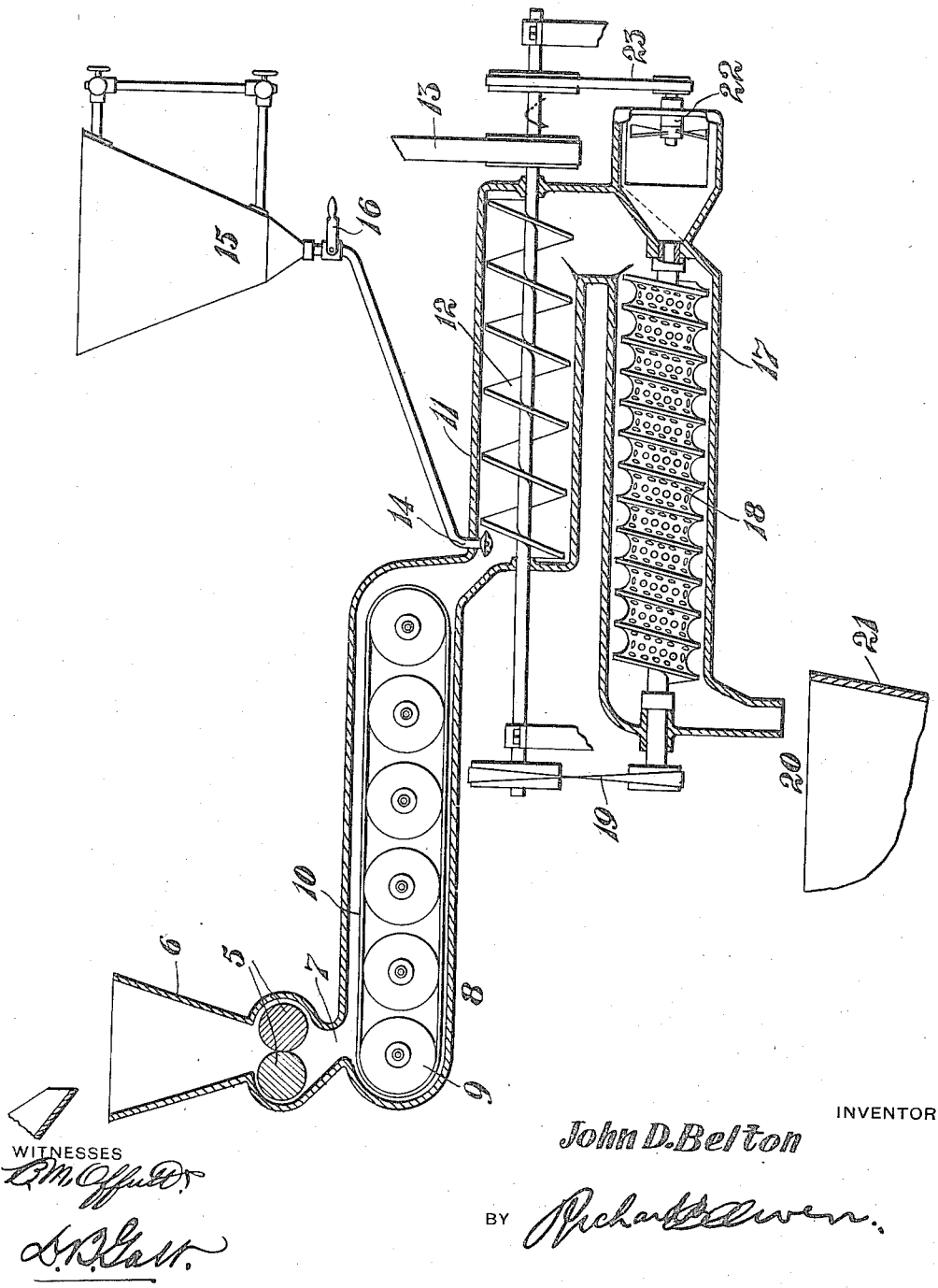
INVENTOR
John D. Belton
BY *Richard Owen*
ATTORNEY
WITNESSES

UNITED STATES PATENT OFFICE.

JOHN D. BELTON, OF CROWLEY, LOUISIANA, ASSIGNOR OF ONE-HALF TO ALECK BROWN, OF MORSE, LOUISIANA.

APPARATUS FOR PREPARING FOOD.

1,228,640.  Specification of Letters Patent.  Patented June 5, 1917.

Application filed July 13, 1916. Serial No. 109,148.

*To all whom it may concern:*

Be it known that I, JOHN D. BELTON, a citizen of the United States, residing at Crowley, in the parish of Acadia and State of Louisiana, have invented certain new and useful Improvements in Apparatus for Preparing Food, of which the following is a specification.

This invention relates to methods or processes of mixing food, and is particularly directed to the preparation of stock feed.

The primary object of the invention is to provide a simplified and improved means for properly macerating the food ingredients and thoroughly drying the same before being mixed with the molasses or other fluid and being packed and distributed for use.

A further object of the invention is to provide an improved means for thoroughly mixing the food ingredients with molasses, and for removing the heat from the mass during the mixing operation.

A still further and particular object of the invention is to provide a mechanism for carrying the process into effect, which is of simple and inexpensive construction, which may be maintained at comparatively low expense, which is composed of but few simple and readily assembled parts, all so constructed and arranged as to preclude the possibility of wear, breakage or derangement of the same, and which will thoroughly perform the functions for which it is designed.

With these objects in view, together with others which will appear as the description proceeds, the invention resides in the novel formation, combination and arrangement of parts, all of which will be described more fully hereinafter, illustrated in the drawings, and particularly pointed out in the claims.

In the drawings:—

The figure represents a sectional view, parts in elevation of a mechanism for carrying the improved process into effect.

The product of the method and mechanism to be hereafter detailed, consists of sugar or molasses coated cereals, such as cracked or crushed corn, Kafir corn, milo maize, etc.

The method consists generally in thoroughly breaking, or crushing the food ingredients, removing all moisture therefrom, and at the same time heating the ingredients, then thoroughly mixing the hot molasses or sugar with the food ingredients and thoroughly mixing the mass. During the mixing process, the heat is extracted from the mass, so that the product is free of heat and moisture when in a state to be packed or shipped. This method is carried into effect by the use of the following mechanism:

A plurality of crushing rollers 5 are arranged within a suitable hopper 6, by means of which the food ingredients introduced to the hopper are thoroughly ground, cracked or crushed before being delivered through the lower end 7 of the hopper to the moisture extracting device indicated at 8. This moisture extractor mechanism comprises a series of horizontally arranged steam heated rollers 9, over which an endless belt 10 is trained, one end of the conveyer belt communicating with the open end 7 of the macerating chamber. Any particular type of steam drier may be used for this purpose. As the rollers rotate, the belt carrying the crushed food ingredients passes forwardly of the device, and during this movement, the intense heat from the rollers toasts or removes the moisture from the ingredients. The forward end of the conveyer 10 communicates with a chamber 11 within which is arranged a spiral mixing conveyer 12, the latter being driven by a belt or chain indicated at 13. A nozzle 14 communicates with the chamber 11 at the forward end thereof, through which molasses, sugar or the like is introduced to the said chamber as the heated food ingredients are delivered to the spiral mixer. The molasses may be fed from a suitable tank or reservoir 15 and a valve 16 may be arranged in the pipe to control the flow of molasses.

As the food ingredients enter the mixing chamber, the molasses or sugar is also admitted and the conveyer 12 thoroughly intermingles the food ingredients with the molasses or sugar during the advancing movement of the mass. The rearward end of the chamber 12 communicates at its lower end with an aspirator 17, the latter comprising a chamber within which is mounted a screw or spiral drum 18 for advancing the mass through the chamber. This drum may be driven through the medium of a belt 19 trained over suitable pulleys upon the drum and screw conveyer shafts. The forward end of the aspirator chamber is provided with a discharge opening 20, through which the mass is delivered to a suitable receptacle indicated at 21.

The fan or blower 22 is associated with an aspirator to create in the latter a current of air to cool the mass being driven forward by the drum 18. This fan may be driven by a suitable belt 23 trained over the spiral conveyer shaft. If desired, the drum 18 may be of foraminous formation, whereby a free circulation of air through the aspirator may be produced. It is apparent that when the thoroughly mixed food ingredients and molasses or sugar is discharged into the aspirator, the drum 18 will advance and further mix the mass, and at the same time, the air currents within the aspirator chamber will remove excessive heat from the mixer. When the mass has been advanced to the forward end of the aspirator chamber, it will be discharged through an opening 20 into the receptacle 21, whereupon it may be packed in suitable receptacles for shipment. By thus treating the food ingredients in their mixture or preparation, the moisture is removed from the food so that the cartons or packages containing the food will not become discolored and unsightly.

It is apparent from the above described arrangement that the food ingredients are treated in such manner as to produce a highly nutritious food, as none of the steps in the process prove detrimental to the nourishing qualities of the ingredients. It is further to be observed that the method may, by means of the above described mechanism, be carried into effect and maintained at comparatively little expense.

While the above is a description of the preferred embodiment of the invention, it is obvious that various changes in the minor details of construction and arrangement of parts may be resorted to without departing from the spirit of the invention or exceeding the scope of the claims.

What is claimed is:—

1. In a device of the class described, a heating and mixing chamber, the former communicating with the latter, heated rollers in said heating chamber, a belt conveyer on said rollers, a spiral conveyer in said mixing chamber, an aspirator chamber communicating with said mixing chamber, a spiral drum in said aspirator, means for rotating said conveyer and drum, and means for creating air currents in said aspirator, substantially as described.

2. In a device of the class described, a mixing chamber, a screw conveyer in said chamber, a molasses introducing nozzle in said chamber, an aspirator chamber communicating with said mixing chamber, a spiral drum in said aspirator chamber, a fan for creating air currents in said chamber and drum, and means for driving said screw conveyer, drum and fan, substantially as described.

In testimony whereof I affix my signature in presence of two witnesses.

JOHN D. BELTON.

Witnesses:
E. BELTON,
M. BELTON.